US006928565B2

(12) United States Patent
Watts, Jr. et al.

(10) Patent No.: US 6,928,565 B2
(45) Date of Patent: Aug. 9, 2005

(54) COMPUTER SYSTEM THERMAL LAP MANAGEMENT METHOD AND APPARATUS

(75) Inventors: La Vaughn F. Watts, Jr., Austin, TX (US); Kofi Nkisah Dadzie, Austin, TX (US); Yi Zhang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 736 days.

(21) Appl. No.: 09/834,846

(22) Filed: Apr. 13, 2001

(65) Prior Publication Data

US 2002/0152406 A1 Oct. 17, 2002

(51) Int. Cl.$^7$ .............................. G06F 1/20; G06F 1/28
(52) U.S. Cl. ...................... 713/322; 713/300; 361/687; 361/695; 374/102
(58) Field of Search ................................ 713/300, 322, 713/323, 324, 340; 361/93.8, 103, 124, 161, 676, 687, 695; 374/100, 101, 102, 178; 702/63, 99, 130, 132, 136

(56) References Cited

U.S. PATENT DOCUMENTS

| | | | |
|---|---|---|---|
| 5,652,893 A | * | 7/1997 | Ben-Meir et al. ........... 713/310 |
| 5,713,030 A | * | 1/1998 | Evoy .......................... 713/322 |
| 5,936,836 A | | 8/1999 | Scholder |
| 5,969,939 A | | 10/1999 | Moss et al. |
| 6,005,770 A | | 12/1999 | Schmitt |
| 6,058,009 A | | 5/2000 | Hood, III et al. |
| 6,311,287 B1 | * | 10/2001 | Dischler et al. ............ 713/601 |
| 6,397,343 B1 | * | 5/2002 | Williams et al. ............ 713/501 |
| 6,487,668 B2 | * | 11/2002 | Thomas et al. ............. 713/322 |
| 6,535,798 B1 | * | 3/2003 | Bhatia et al. ............... 700/293 |
| 6,574,740 B1 | * | 6/2003 | Odaohhara et al. ......... 713/323 |

OTHER PUBLICATIONS

Y. Tada, A. Takimoto, and Y. Hayashi, *Heat Transfer Enhancement In A Convective Field By Applying Ionic Wind*. The Gordon and Breach Publishing Group, Sep. 1996.
Brian S. Akre, *Ford To Test System that Eats Smog*. Global Platinum & Gold, Inc. Market Discussions, Nov. 1998.
Sam Atwood, *AQMD Investigates Ozone–Eating Catalyst*. AQMD Advisor newsletter, Jan. 1997.
Jeffrey B. Hoke, Ronald M. Heck and Terry C. Poles, *PremAir Catalyst System–A New Approach to Cleaning the Air*, SAE Technical Paper Series—Presented at International Fall Fuels & Lubricants Meeting Oct. 1999.

* cited by examiner

*Primary Examiner*—Thuan Du
(74) *Attorney, Agent, or Firm*—Haynes and Boone, LLP

(57) ABSTRACT

A computer comprises a central processing unit, at least one fan disposed for providing cooling to the at least one central processing unit, and a thermal manager. The thermal manager monitors a temperature of the central processing unit and dynamically controls a throttling of the central processing unit and the at least one fan according to a thermal management algorithm.

33 Claims, 9 Drawing Sheets

| Cool Lap 7 | smart CPU | HDD timer | monitor timer | system timer | ACPI | ambient | surface temp |
|---|---|---|---|---|---|---|---|
| Off | off | off | off | Off | on | 22.8 | 23 |

| time (minutes) | 0 | 5 | 10 | 15 | 20 | 25 | 30 |
|---|---|---|---|---|---|---|---|
| CPU temp | 37 | 56 | 60 | 57 | 59 | 60 | 59 |
| CPU temp in F | 98.6 | 132.8 | 140 | 134.6 | 138.2 | 140 | 138.2 |
| case temp | 24.8 | 28.2 | 31.8 | 34.6 | 36.3 | 38.1 | 38.9 |
| case temp in F | 76.64 | 82.76 | 89.24 | 94.28 | 97.34 | 100.58 | 102.02 |
| CPU speed | 752 | 752 | 752 | 752 | 752 | 752 | 752 |
| application | Excite Extreme 3D Fashion Show | | | | | | |

| time (minutes) | 35 | 40 | 45 | 50 | 55 | 60 |
|---|---|---|---|---|---|---|
| CPU temp | 53 | 59 | 51 | 60 | 59 | 58 |
| CPU temp in F | 127.4 | 138.2 | 123.8 | 140 | 138.2 | 136.4 |
| case temp | 40.2 | 41.2 | 41.6 | 42.1 | 42.6 | 42.8 |
| case temp in F | 104.36 | 106.16 | 106.88 | 107.78 | 108.68 | 109.04 |
| CPU speed | 752 | 752 | 752 | 752 | 752 | 752 |
| application | Excite Extreme 3D Fashion Show | | | | | |

FIGURE 2

| Cool Lap 7b | smart CPU | HDD timer | monitor timer | system timer | ACPI | ambient | surface temp |
|---|---|---|---|---|---|---|---|
| On | on | off | off | off | on | 23.1 | 24.4 |

| time (minutes) | 0 | 5 | 10 | 15 | 20 | 25 | 30 |
|---|---|---|---|---|---|---|---|
| CPU temp | 32 | 48 | 47 | 48 | 49 | 49 | 50 |
| CPU temp in F | 89.6 | 118.4 | 116.6 | 118.4 | 120.2 | 120.2 | 122 |
| case temp | 26.5 | 30 | 32.2 | 33.7 | 34.5 | 35.2 | 35.8 |
| case temp in F | 79.7 | 86 | 89.96 | 92.66 | 94.1 | 95.36 | 96.44 |
| CPU speed | 693 | 694 | 604 | 604 | 605 | 602 | 604 |
| Application | Excite Extreme 3D fashion show | | | | | | |

| time (minutes) | 35 | 40 | 45 | 50 | 55 | 60 |
|---|---|---|---|---|---|---|
| CPU temp | 49 | 49 | 50 | 50 | 50 | 50 |
| CPU temp in F | 120.2 | 120.2 | 122 | 122 | 122 | 122 |
| case temp | 36.2 | 36.5 | 36.8 | 37 | 37.3 | 37.5 |
| case temp in F | 97.16 | 97.7 | 98.24 | 98.6 | 99.14 | 99.5 |
| CPU speed | 604 | 603 | 608 | 604 | 604 | 604 |
| Application | Excite Extreme 3D fashion show | | | | | |

Figure 4

Data flow in Cool Lap

| Lower Range | Value | Higher Range | Value | Action |
|---|---|---|---|---|
| TEMP_ABS_LOW : | -128 | RANGE_1_HI : | 23 | No Action |
| RANGE_1_LO : | 20 | RANGE_2_HI : | 25 | No Action |
| RANGE_2_LO : | 22 | RANGE_3_HI : | 26 | TH1, Fan1 Low |
| RANGE_3_LO : | 23 | RANGE_4_HI : | 27 | TH1, Fan1 Hi |
| RANGE_4_LO : | 24 | RANGE_5_HI : | 55 | TH1, Fan1 Hi, Fan2 Low |
| RANGE_5_LO : | 47 | RANGE_6_HI : | 65 | TH2, Fan1 Hi, Fan2 Hi |
| RANGE_6_LO : | 58 | RANGE_7_HI : | 90 | TH3, Fan1 Hi, Fan2 Hi |
| RANGE_7_LO : | 55 | TEMP_CRITICAL-1 : | 101 | TH4, Fan1 Hi, Fan2 Hi |
| RANGE_8_LO : | 90 | TEMP_CRITICAL : | 102 | TH4, Fan1 Hi, Fan2 Hi, ACPINOTIFY |
| | | | | SwOff (Power off the unit) |

FIGURE 8

| Lower Range | Value | Higher Range | Value | Action |
|---|---|---|---|---|
| TEMP_ABS_LOW : | -128 | RANGE_1_HI : | 23 | No Action |
| RANGE_1_LO : | 20 | RANGE_2_HI : | 25 | No Action |
| RANGE_2_LO : | 22 | RANGE_3_HI : | 26 | TH1, Fan1 Low |
| RANGE_3_LO : | 23 | RANGE_4_HI : | 27 | TH1, Fan1 Hi |
| RANGE_4_LO : | 24 | RANGE_5_HI : | 50 | TH1, Fan1 Hi, Fan2 Low |
| RANGE_5_LO : | 42 | RANGE_6_HI : | 60 | TH2, Fan1 Hi, Fan2 Hi |
| RANGE_6_LO : | 53 | RANGE_7_HI : | 75 | TH3, Fan1 Hi, Fan2 Hi |
| RANGE_7_LO : | 60 | TEMP_CRITICAL-1 : | 101 | TH4, Fan1 Hi, Fan2 Hi |
| RANGE_8_LO : | 90 | TEMP_CRITICAL : | 102 | TH4, Fan1 Hi, Fan2 Hi, ACPINOTIFY |
| | | | | SwOff (Power off the unit) |

FIGURE 9

COMPUTER SYSTEM THERMAL LAP MANAGEMENT METHOD AND APPARATUS

BACKGROUND

The disclosures herein relate generally to portable computers and more particularly to user selectable thermal lap management method and apparatus for establishing a desired lap operating environment.

Computers, being electronic devices, include several heat generating components. In the field of portable notebook computers, the notebook computers are often used while being positioned on the user's lap, hence the name "laptop" computers evolved. Users often complain that when using a portable notebook computer on their lap, the operating temperature of the computer becomes elevated above the normal human body temperature. In some instances, the base of a laptop computer becomes "warm" or hot to the touch. Accordingly, the computer temperature causes at least an uncomfortably warm sensation to the user's lap. The longer that the user works with the computer positioned on the lap, the warmer or hotter the computer feels to the user. In addition, components of today's portable computers operate much hotter than in computers of the past, in part, because of the new central processing units (CPU's), larger batteries and larger AC adapters, presently installed.

A solution to the laptop computer thermal problem is needed.

SUMMARY

According to one embodiment of the present disclosure, a computer comprises a central processing unit, at least one fan disposed for providing cooling to the at least one central processing unit, and a thermal manager. The thermal manager monitors a temperature of the central processing unit and dynamically controls a throttling of the central processing unit and the at least one fan according to a thermal management algorithm.

A principal advantage of this embodiment is that it includes a user setup, as part of the system BIOS, for allowing the user to select the type of thermal lap management desired. The user setup can be back fitted to existing laptop computer models and also installed into production models. Accordingly, a user has an ability to select from a number of algorithms used to determine a preferred personal lap operating environment.

BRIEF DESCRIPTION OF THE DRAWINGS

FIG. 8 is an illustrative view of an exemplary algorithm table according to one embodiment of the present disclosure; and FIG. 9 is an illustrative view of an exemplary algorithm table according to another embodiment of the present disclosure.

DETAILED DESCRIPTION

In accordance with the present embodiments, the thermal problem has been analyzed with the use of several case studies. In particular, the case studies investigated how notebook computers are being used by computer users. In view of the usage patterns, the present embodiments include a solution having various stages. These solutions can be back fitted into an installed base of laptop computers.

Aided with disclosures herein, implementation of the present embodiments by those skilled in the art will be readily understood. In consideration of a total approach to a largest number of scenarios and state diagrams, the total solution is much more difficult.

Underlying the solution of the present embodiments is a stipulation to lower the term threshold for thermal management when a notebook computer is being used on the human lap. While such a stipulation may sound simple, just how to determine the temperature and when to thermal adjust is not so simple.

With respect to thermal management, it is important to keep in mind that one must still provide performance when needed while the notebook is operational on the human lap. Accordingly, in order to complete the total picture, the present embodiments provide the addition of a user setup to the computer that allows the user to select the type of thermal lap management desired. In one embodiment, the user setup includes a basic input output system (BIOS) setup. In another embodiment, the user setup includes an automatic setting to allow an automatic establishment of the thermal lap management, wherein no user input is required.

Figure 1:
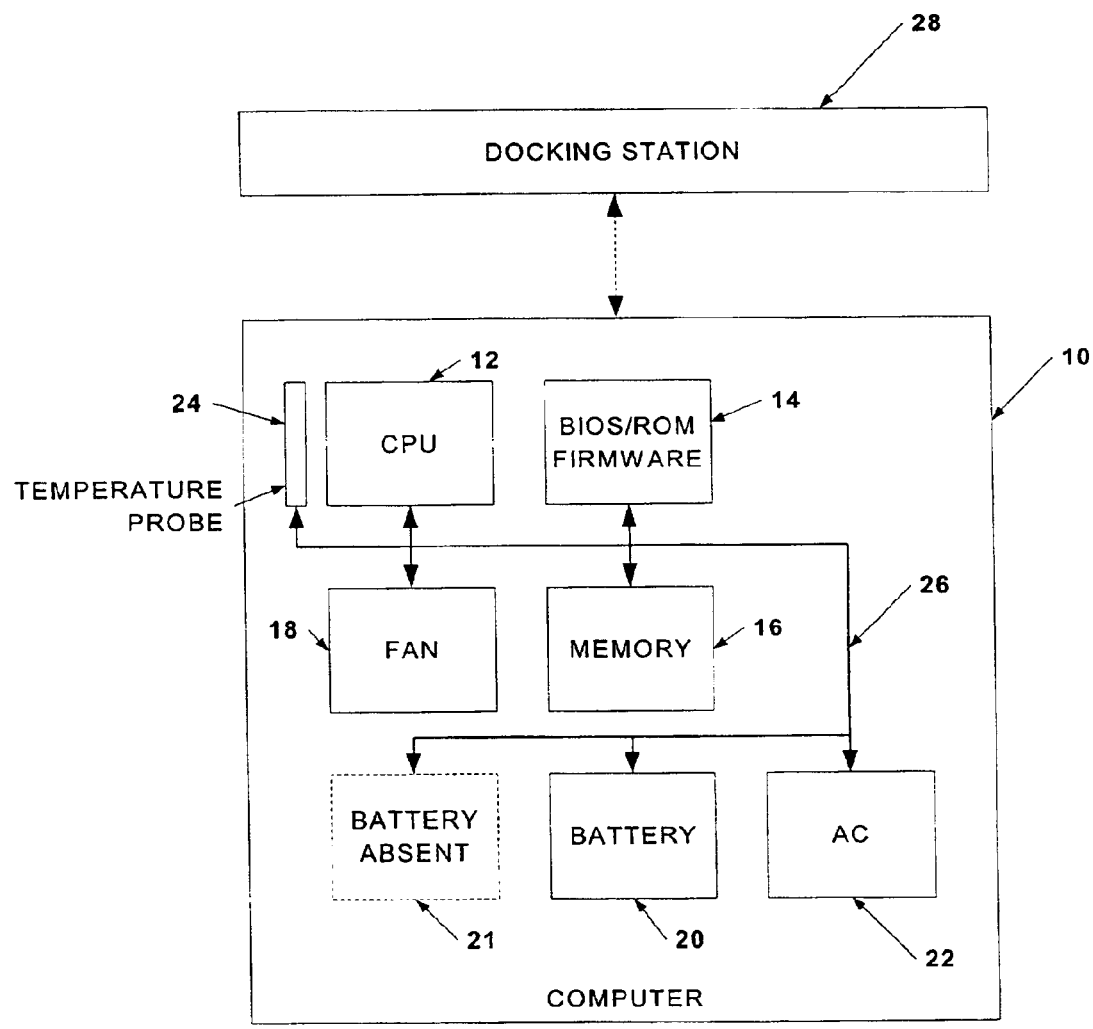
FIG. 1 illustrates an exemplary computer incorporating thermal lap management according to one embodiment of the present disclosure.

Turning now to FIG. 1, an exemplary computer 10 incorporating thermal lap management according to one embodiment of the present disclosure is illustrated. Computer 10 includes a central processing unit (CPU) 12, read only memory (ROM) 14, and memory 16. Computer 10 further includes at least one fan 18, at least one battery 20 (for example, a removable battery), an AC power unit 22, and a temperature probe 24. A battery absent position is illustrated by reference numeral 21. The components of computer 10 are interconnected via one or more buses, shown collectively as a bus 26. Computer 10 may also include other components such as input/output (I/O) devices (for example, a display, a keyboard, a mouse or other pointer device, and associated controllers), a hard disk drive, and other storage devices (for example, a floppy disk drive, CD-ROM drive, and the like), and various other subsystems, such as a network interface card). These other components are known in the art and not shown in the Figures nor described further herein for simplicity of explanation.

With reference still to FIG. 1, ROM 14 includes the computer system basic input output system (BIOS), otherwise referred to as firmware, of computer 10. In addition, fan 18 provides a prescribed cooling action to CPU 12 according to the embodiments of the present disclosure, as further discussed herein. Note that while only one fan 18 is illustrated, more than one fan is possible. Temperature probe 24 provides temperature information, for example, of at least CPU 12.

In the instance of computer 10 comprising a notebook computer, a docking station 28, also referred to as a port replicator, enables computer 10 to be operated in a docked mode, as is known in the art. The docking station enables computer 10 to be easily coupled via a docking connector to a variety of other connections, for example, a video connector, parallel connector, universal serial bus (USB) connector, serial connector, AC adapter connector, etc. Computer 10 further includes a top cover and a base. With a notebook or laptop computer, the top cover generally includes a display screen and opens up to reveal a keyboard underneath the same. The computer further includes a base, on an opposite side from the top cover.

According to one embodiment of the present disclosure, a setup routine allows a computer user to select the type of algorithm for thermal lap management. In this manner, the computer user determines the best lap operation environment for himself. As a result, the actual environment that is used can be adjusted to better fit the operational characteristic of the user.

Referring still to FIG. 1, computer 10 includes at least one central processing unit, at least one fan disposed for providing cooling to the at least one central processing unit, and a thermal manager. In one embodiment, the thermal manager is included within the system BIOS stored in ROM 14.

The thermal manager monitors a temperature of the at least one central processing unit and dynamically controls a throttling of the central processing unit and the at least one fan according to a thermal management algorithm, further as discussed below. The thermal management algorithm enables stabilization of the temperature of the at least one central processing unit below a prescribed temperature threshold over a given duration of time. In one embodiment, the temperature threshold includes body temperature.

In further discussion of the thermal manager, the thermal manager includes at least one basic input output system (BIOS) table. The at least one BIOS table identifies specific cooling actions to be implemented as a function of the temperature of the at least one central processing unit.

Computer 10 of FIG. 1 further includes a user setup routine stored in ROM 14 and/or memory 16. The user setup routine enables a user to select a desired thermal operation mode for the thermal manager. The thermal operation modes include one or more of the following selected from (a) OFF Mode, wherein the OFF Mode disables a dynamic thermal management by the thermal manager, (b) ON Mode, wherein the ON Mode enables dynamic thermal management by the thermal manager, and (c) AUTO Mode, wherein the AUTO Mode enables and disables dynamic thermal management by the thermal manager according to a prescribed computer operational characteristic. The prescribed computer operational characteristics may include one or more of the following modes selected from AC power mode, AC power with battery present mode, AC power mode with battery present and charge mode, AC power with battery absent mode, DC power mode, and computer docked mode with AC power.

In one embodiment, the OFF Mode is characterized by a first thermal management algorithm, the ON Mode characterized by a second thermal management algorithm, and the AUTO Mode characterized by a third thermal management algorithm. The user setup routine may also include an AUTO Mode designated as a default setting, requiring no user input.

The first thermal management algorithm includes a thermal management algorithm of the computer absent any dynamic thermal management. The second thermal management algorithm includes one or more of the following selected from the actions of (a) adjusting the thermal temperature threshold to be lower than body temperature, (b) enabling a smart CPU feature contained in a basic input output system (BIOS) of the computer, and (c) giving priority to the fan if the computer is in an AC power mode. The third thermal management algorithm includes one or more of the following actions: (a) if the computer is docked in a docking station, then assume dynamic thermal management is in OFF Mode and do not adjust any temperature thresholds, (b) if the computer is not docked, then adjust the temperature thresholds to below body temperature, (c) if the computer is in AC power mode, then give thermal management priority to the fan for holding the temperature of the central processing unit down, and (d) if in DC power mode, utilize a new temperature threshold that is lower than body temperature for activation of thermal management by the thermal manager.

In connection with the above, the smart CPU feature includes a function in BIOS for putting the central processing unit into at least one low power state. According to one embodiment, the cooling action of the thermal manager may further include causing the smart CPU feature to put the central processing unit into the low power mode, even if the central processing unit is not idle. In addition, the thermal manager may intermittently call the smart CPU feature to effectively reduce a rate of rise in central processing unit temperature.

In one embodiment, the computer comprises a laptop computer and the thermal manager maintains a temperature of a case of the computer proximate a location of the central processing unit to no more than body temperature. In addition, the thermal manager is operable upon launching of an operating system of the computer. The operating system includes a CPU temperature reading function. The thermal manager is further operable according to an enable, disable, and automatically enable/disable option via a graphical user interface control application.

According to another embodiment, the thermal manager carries out thermal management via a system management basic input output system (SMBIOS). A system management interrupt (SMI) triggers each time the temperature of the central processing unit falls outside of a given temperature range. Responsive to the SMI interrupt, the thermal manager invokes a corresponding cooling action according to the thermal management algorithm. The thermal management algorithm is characterized by thermal tables representative of various conditions that include at least DC power mode and AC power mode, respectively. The thermal manager switches the thermal tables in and out dynamically in response to an SMI representative of a respective condition. The thermal manager further utilizes advanced configuration and power interface (ACPI) functions for (a) returning the central processing unit temperature reading, (b) enabling thermal management, or (c) disabling thermal management.

In further discussion of the above, the user selection is implemented in the form of a state flow as follows:

User Selection: Thermal Lap Operations [Smart Temp]= OFF, ON, AUTO

Flow:

Smart Temp=OFF—Do nothing different than what is currently done in the computer today without thermal lap operations.

=ON—Adjust the thermal temperature thresholds to be lower than the body temperature, turn on "Smart CPU," and give priority to the fan if on alternating-current (AC). If the computer system is docked, do not adjust the thermal temperature thresholds and assume the Smart Temp selection is OFF.

=AUTO—If the computer system is docked, then assume the Smart Temp selection is OFF and do not adjust the thermal thresholds. If the computer system is not docked, or not connected to a port replicator, then adjust the thermal thresholds to below the human body temperature. If the computer system is on AC, then give thermal management priority to using the fan to hold the temperature down. Otherwise, the normal battery thermal management software is to be used with new and lower body thresholds for the temperature to kick in the thermal lap management.

According to another embodiment, the thermal lap management method includes an advanced algorithm that looks at not only the AC charge, but also looks at battery temperatures and corresponding battery charge status, to determine if the thermal thresholds need to be adjusted down lower.

In yet another embodiment, the thermal lap management method and apparatus includes a simple test. According to the simple test, the method includes determining when the computer system is operating on battery. If so, then the method lowers the thermal thresholds as discussed herein, and gives a thermal management priority to the computer system fan, while executing a normal thermal management code.

Accordingly, the thermal management algorithm maintains the case temperature of the laptop computer at or below body temperature. As a result, the laptop computer user is kept comfortable, and not made uncomfortable due to high case temperatures that occur over time absent the method of the present disclosure.

As discussed herein, certain electronic components within the laptop computer generate a lot of heat when in operation. These components include, but are not limited to, the CPU, memory, video card, hard disk drive, and the battery. Furthermore, the battery generates a lot of heat particularly when charging. According to the present embodiments, the thermal lap management method and apparatus stabilize the temperature of the laptop computer case at around body temperature by maintaining the temperature of the CPU within a certain prescribed temperature range, or at a given level, during operation and usage.

EXAMPLE IMPLEMENTATION

The thermal lap management method and apparatus of the present disclosure can be implemented, for example, using a notebook computer, such as a Latitude C600, commercially available from Dell Computer of Austin, Tex.

Several challenges were overcome in the development of a thermal lap management (e.g. Cool Lap) algorithm of the present embodiments. The challenges included identifying techniques to efficiently manipulate and record active and passive cooling mechanisms within the computer system; generating real time flow of thermal data from the BIOS into the operating system (OS); and developing a data analysis model for arriving at the highest possible CPU performance speed and hence a temperature that could sustain the Cool Lap CPU top case thresholds. An additional challenge included maintaining a consistency in the testing conditions and environment.

In connection with identifying techniques to efficiently manipulate and record active and passive cooling methods, the present embodiments make use of the BIOS to determine optimal temperature ranges. In connection with the challenge of generating a real time flow of thermal data from the BIOS into the operating system, the present embodiments utilize the WMI/ACPI interface.

THE ALGORITHM

According to one embodiment, Cool Lap is implemented using tables in the BIOS consisting of thermal ranges and corresponding cooling actions to be performed within the respective ranges. Cooling is implemented with the use of at least one fan and CPU clock throttling. FIGS. 8 and 9 illustrate exemplary BIOS thermal tables used to implement specific cooling actions based upon the temperature of the CPU, to be further discussed below.

In addition to the tables in BIOS, the present embodiments make use of a smart CPU (SmartCPU) feature. The SmartCPU feature is a mechanism used in the BIOS to put the CPU into low power states, for example, power state C2 or C3, based upon whether or not the CPU is idle. When used in conjunction with Cool Lap embodiments of the present disclosures, SmartCPU helps maintain the temperature of the CPU for longer periods within a given thermal range. For experimental purposes, a software program, suitable for causing heat generation within the laptop computer, was used in Windows™ that allowed the CPU to go idle for only very short bursts, probably on the order of no greater than 1 or 2 seconds. With the intermittent use of the SmartCPU feature, this was discovered to provide enough time for the CPU to cool down by a minimum of about 6 degrees Celsius before being awoken and substantially instantly returning to its original temperature. Accordingly, the intermittent SmartCPU BIOS calls effectively reduced the rate of rise in CPU temperature.

A main challenge in developing the algorithm was in finding temperature ranges that would be optimal for the different scenarios such as AC power with fast battery charge, AC without charge, AC without a battery, etc. Accordingly, the worst case was chosen as optimal because it would provide cooling under the highest heat generating condition (for example, AC with fast charge), or simply maintain a cooler case temperature under less heat generating conditions (for example, AC with no charge). In addition, a separate algorithm is implemented for DC power.

DATA ANALYSIS

Charts and trend lines were generated from the experimental data obtained. These were used to determine what CPU temperatures (and hence speeds) could be sustained while maintaining the case temperature at or below body temperature over a 60 minute time period. The experimental data recorded consisted of the CPU temperature, case temperature and CPU speed at 5-minute intervals.

Figure 3:
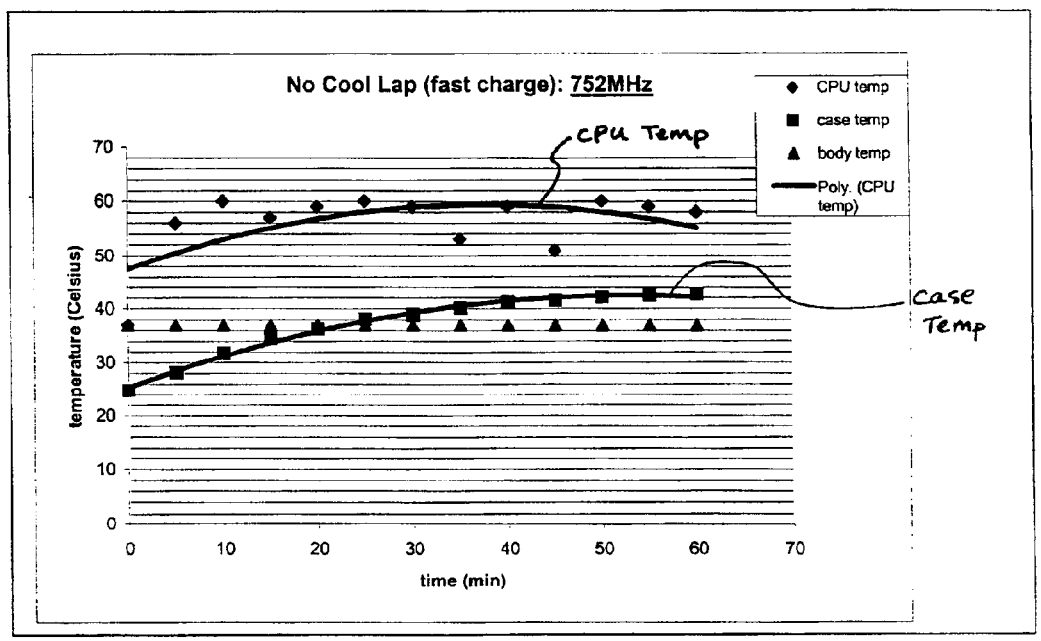
FIG. 3 is a graphical plot of temperature vs. time corresponding to the CPU and case temperature data of FIG. 2.
Figures 1, 2:
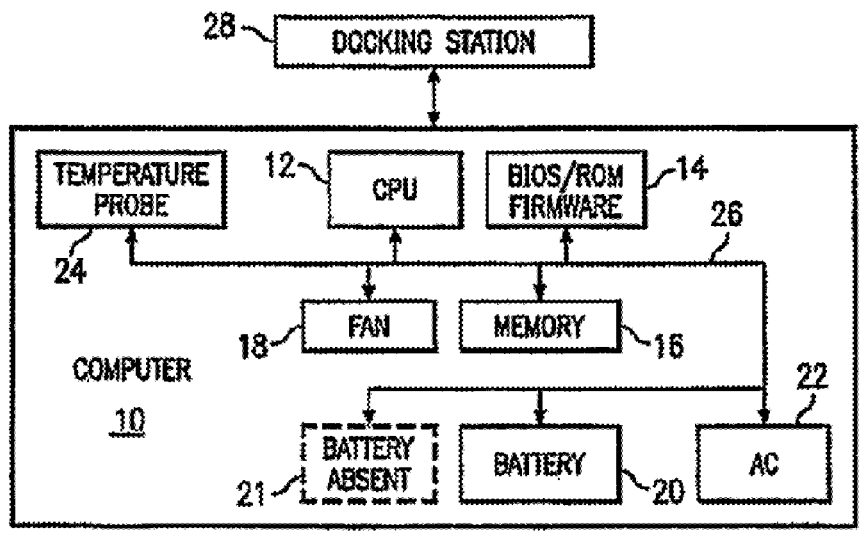
FIG. 2 illustrates exemplary data obtained via a study of case temperature vs. time without thermal lap management of the present disclosures.

Tests were performed under different conditions such as with AC power on high battery charge, low battery charge, battery physically not present, DC power, SmartCPU on, SmartCPU off etc. The testing environment that produced the highest case temperature over time was used to define the algorithm. FIG. 2 illustrates a table of experimental values for heat generation with the Cool Lap algorithm of the present disclosure disabled over a 60-minute period. FIG. 3 is a graphical plot of temperature vs. time corresponding to the CPU and case temperature data of FIG. 2. In connection with FIGS. 3 and 5, body temperature is assumed to be on the order of 37 degrees Celsius.

Figure 5:
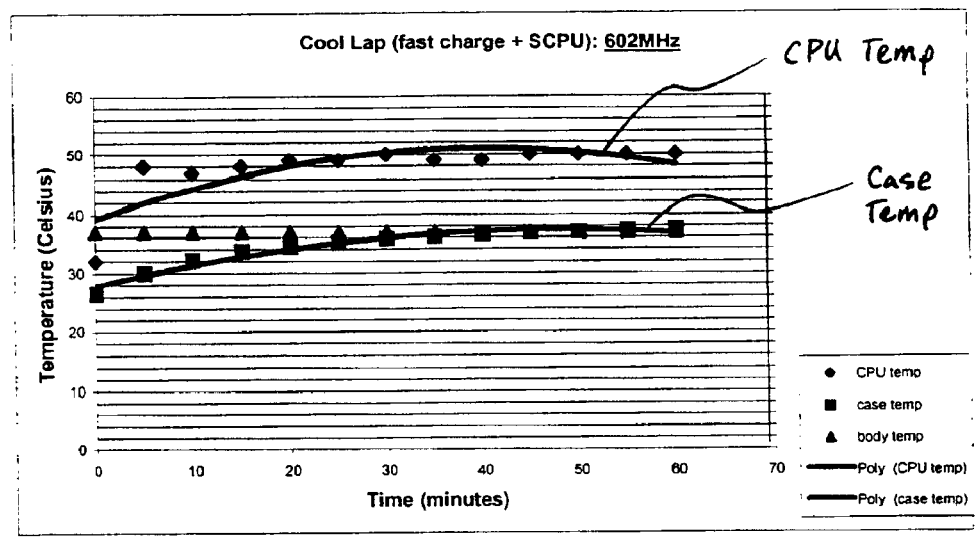
FIG. 5 is a graphical plot of temperature vs. time corresponding to the CPU and case temperature data of FIG. 4 according to an embodiment of the present disclosures.
Figures 3, 4:
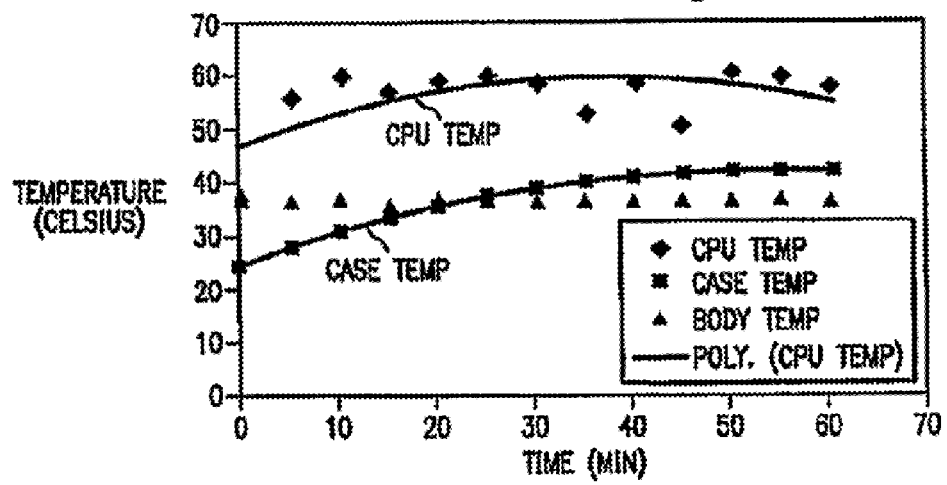
FIG. 4 illustrates exemplary data obtained via a study of case temperature vs. time with thermal lap management of the present disclosures.
Figure 5:
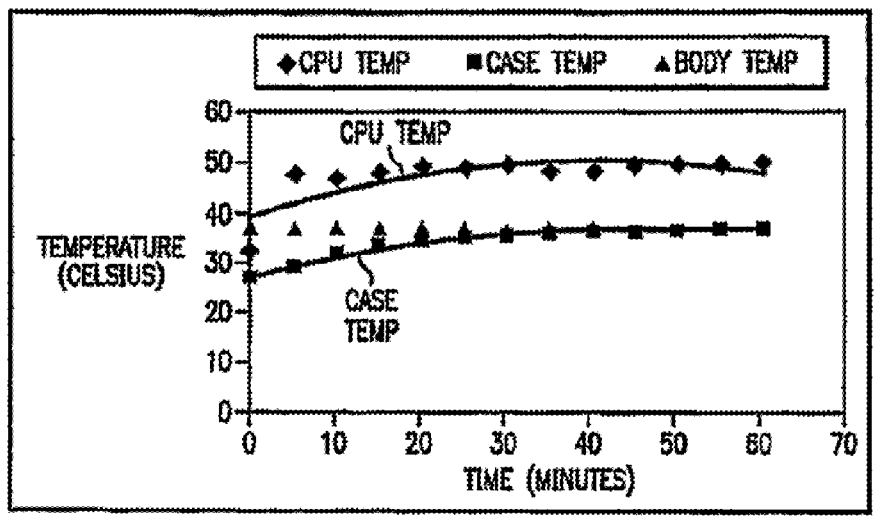
Figure 6:
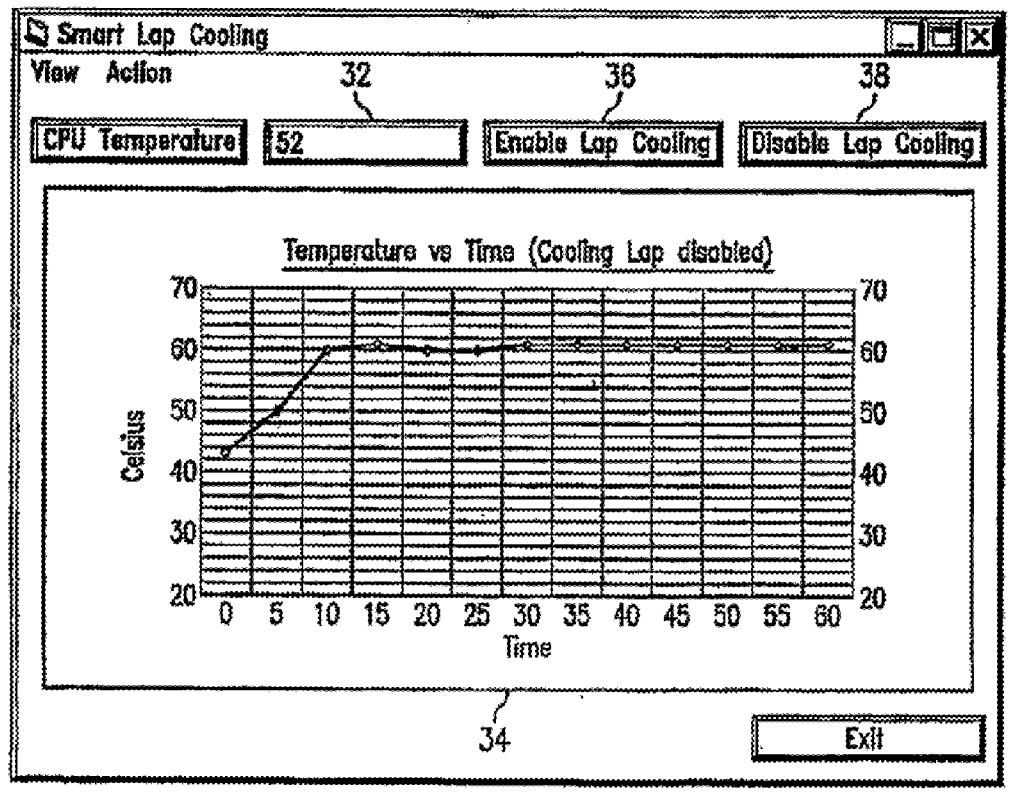

FIG. 4 illustrates exemplary data obtained via a study of case temperature vs. time with thermal lap management of the present disclosures. As evidenced in the data of FIG. 4, the notebook computer case temperature is noted to be 5 degrees Celsius less with the Cool Lap algorithm and SmartCPU (SCPU) active after the same 60-minute period. FIG. 5 is a graphical plot of temperature vs. time corresponding to the CPU and case temperature data of FIG. 4 according to an embodiment of the present disclosure.

In connection with FIGS. 3 and 5, the number in MHz indicated therein, respectively, represents the average CPU speed over the testing period, as will be understood from the discussion further herein below with respect to the Smart-CPU. The computer system used for testing purposes included a 752 MHz processor.

WINDOWS GUI CONTROL

Figure 6:
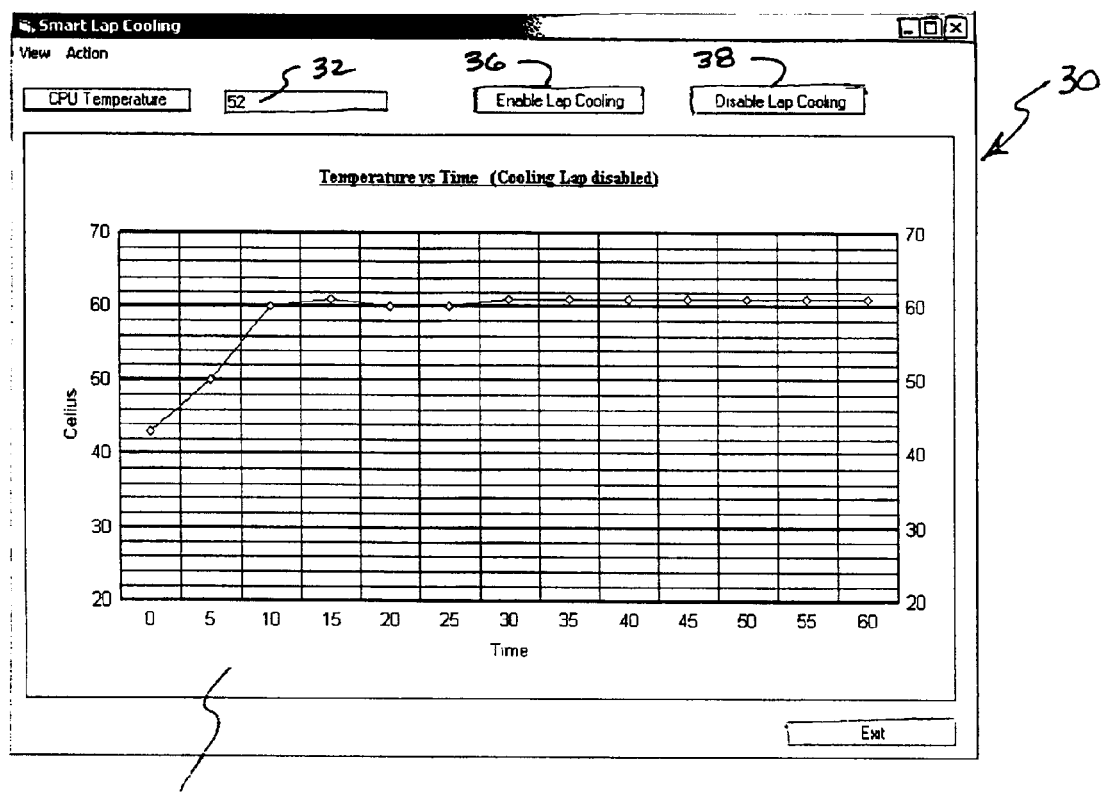
FIG. 6 illustrates a graphical user interface view of one embodiment of the present disclosure.

Turning now to FIG. 6, according to one embodiment, a Windows™ based graphical user interface (GUI) control, generally indicated by reference numeral 30, implements the thermal lap management as disclosed herein. For instance, when a computer user launches into Windows™ on a Cool Lap enabled (e.g., a thermal lap management enabled) notebook personal computer (PC), the user will have the option to switch on the Cool Lap environment using a prescribed Windows™ GUI controlled application. FIG. 6 illustrates an exemplary GUI 30. The GUI application was developed in Visual Basic and can include a CPU temperature reading 32 with a corresponding chart 34. The chart 34 is helpful, for example, for development and testing purposes. GUI 30 further includes user selectable options of Enable Lap Cooling 36 and Disable Lap Cooling 38.

The GUI application further implements the method of thermal lap management of the present embodiments using a Windows™ Management Instrumentation/Advanced Configuration and Power Interface (WMI/ACPI). The GUI application further obtains CPU temperature readings from thermal probe 24 (FIG. 1), for example, a MAX1617 thermal probe, or similar probe.

BIOS IMPLEMENTATION

Figure 7:
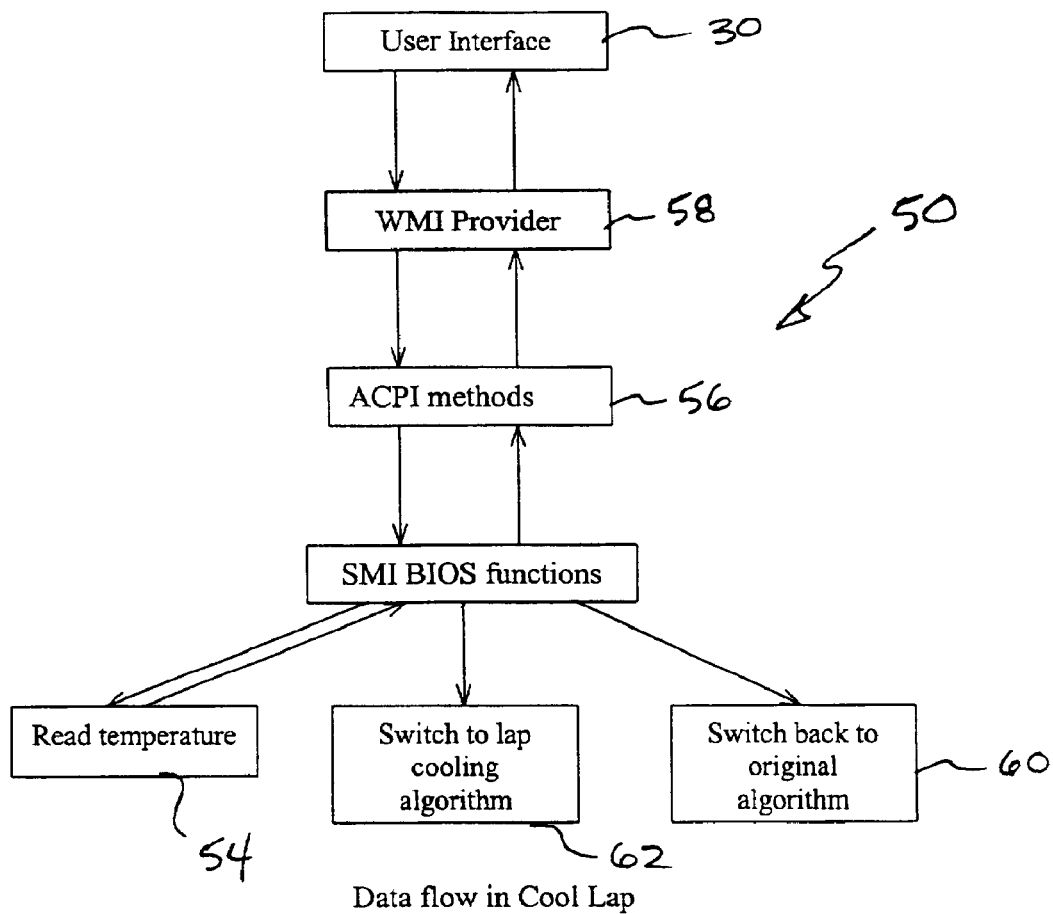
FIG. 7 is a flow diagram view of data flow according to one embodiment of the present disclosure.

Turning now to FIG. 7, a flow diagram view 50 of data flow according to one embodiment of the present disclosure is illustrated, further as discussed herein below. FIG. 8 is an illustrative view of an exemplary algorithm table according to one embodiment of the present disclosure. In particular, FIG. 8 contains exemplary DC (battery) temperature ranges for Cool Lap. Lastly, FIG. 9 is an illustrative view of an exemplary algorithm table according to another embodiment of the present disclosure. In particular, FIG. 9 contains exemplary AC temperature ranges for Cool Lap.

In one embodiment, the thermal control implemented by the Windows™ based application is managed through a system management BIOS interface (SMBIOS), illustrated by block 52 of FIG. 7. More particularly, the thermal control is implemented through SMBIOS via tables containing temperature ranges and corresponding cooling actions, illustrated, for example in the tables of FIGS. 8 and 9. With reference to FIGS. 8 and 9, actions are designated for a given range using notations, wherein the notation TH1=12.5% CPU throttle; TH2=25% CPU throttle; TH3=50% CPU throttle; and TH4=75% CPU throttle. In addition, the notation Fan1 Low, Fan2 Low, Fan1 Hi, and Fan2 Hi represent low and high fan speed settings, respectively for a first and a second fan. Still further, an action may further include an ACPINOTIFY and a SwOff (to power off the unit) action.

Referring again to FIG. 7, during operation, a system management interrupt (SMI) triggers each time the CPU temperature rises or falls beyond the current temperature range. Reading of CPU temperature is accomplished at block 54 of FIG. 7. Triggering of the SMI invokes a corresponding cooling action for the new temperature range, as indicated herein above with respect to FIGS. 8 and 9. Furthermore, the method and apparatus of the present disclosures include thermal tables for different conditions, such as direct current (DC) versus alternating current (AC) power. The thermal range/action tables are switched in and out dynamically when an appropriate SMI is triggered.

The functions responsible for returning the CPU temperature reading, and for enabling and disabling Cool Lap, are implemented in ACPI (block 56 of FIG. 7) as GetTemp, LapEnable and LapDisable. GetTemp reads the CPU temperature as reported by the MAX1617 probe and passes the result to the Windows™ Management Instrumentation (WMI), indicated by reference numeral 58 of FIG. 7. LapEnable switches out a current thermal management algorithm 60 in the computer and replaces it with the Cool Lap algorithm 62. LapDisable reverses the action of LapEnable, for example, switching from the Cool Lap algorithm 62 to the original algorithm 60.

According to the present embodiments, the ACPI functions are interfaces to SMI functions that perform required actions. ACPI provides a function name and its arguments to a buffer assigned for a corresponding SMI function. ACPI then sets the SMI port B2h. Results are sent back to the buffer for collection/retrieval by ACPI.

The embodiments of the thermal lap management of the present disclosures can be coded for implementation in a computer as disclosed herein using programming techniques known in the art.

According to yet another embodiment of the present disclosure, a thermal management method in a computer including at least one central processing unit and at least one fan disposed for providing cooling to the at least one central processing unit includes the following steps. A temperature of the at least one central processing unit is monitored. Responsive to the monitored temperature and in accordance with a thermal management algorithm, the method includes dynamically controlling (i) a throttling of the at least one central processing unit and (ii) operation of the at least one fan for enabling stabilization of the temperature of the at least one central processing unit below a prescribed temperature threshold over a given duration of time. In one embodiment, the temperature threshold includes body temperature.

The method further includes the step of utilizing at least one basic input output system (BIOS) table for the thermal management algorithm. The at least one BIOS table identifies specific cooling actions to be implemented as a function of the temperature of the at least one central processing unit. The method further comprises the steps of utilizing a user setup routine for enabling a user to select a desired thermal management operation mode for dynamically controlling thermal management. The thermal operation modes include at least one of the following selected from the group consisting of (a) OFF Mode, wherein the OFF Mode disables dynamic thermal management, (b) ON Mode, wherein the ON Mode enables dynamic thermal management, and (c) AUTO Mode, wherein the AUTO Mode enables and disables dynamic thermal management according to a prescribed computer operational characteristic.

The prescribed computer operational characteristic includes at least one of the following selected from the group consisting of AC power mode, AC power with battery present mode, AC power mode with battery present and charge mode, AC power with battery absent mode, DC power mode, and computer docked mode with AC power. The OFF Mode is characterized by a first thermal management algorithm. The ON Mode is characterized by a second thermal management algorithm. The AUTO Mode is characterized by a third thermal management algorithm.

According to one embodiment, the first thermal management algorithm includes a thermal management algorithm of the computer absent any dynamic thermal management. The second thermal management algorithm includes at least one of the following selected from the group consisting of (a) adjusting the thermal temperature threshold to be lower than body temperature, (b) enabling a smart CPU feature contained in a basic input output system (BIOS) of the computer, and (c) giving priority to the fan if the computer is in an AC power mode. Lastly, the third thermal management algorithm includes at least one of the following selected from the group consisting of (a) if the computer is docked in a docking station, then assume dynamic thermal management is in OFF Mode and do not adjust any temperature thresholds, (b) if the computer is not docked, then adjust the temperature thresholds to below body temperature, (c) if the computer is in AC power mode, then give thermal management priority to the fan for holding the temperature of the at least one central processing unit down, and (d) if in DC power mode, utilize a new temperature threshold that is lower than body temperature for activation of thermal management.

According to yet another embodiment, a method of upgrading thermal management in a computer having at least one central processing unit and at least one fan disposed for providing cooling to the at least one central processing unit includes the following. A thermal manager is installed in a basic input output system (BIOS) of the computer. At least one thermal management algorithm is stored within the BIOS computer. The thermal manager is operable for monitoring a temperature of the at least one central processing unit and for dynamically controlling a throttling of the at least one central processing unit and the at least one fan according to the at least one thermal management algorithm. The thermal management algorithm further enables stabilization of the temperature of the at least one central processing unit below a prescribed temperature threshold over a given duration of time.

The method further includes utilizing at least one basic input output system (BIOS) table for the thermal management algorithm, the at least one BIOS table identifying specific cooling actions to be implemented as a function of the temperature of the at least one central processing unit. The method further comprises utilizing a user setup routine for enabling a user to select a desired thermal management operation mode for dynamically controlling thermal management, the thermal operation modes including at least one of the following selected from the group consisting of (a) OFF Mode, wherein the OFF Mode disables dynamic thermal management, (b) ON Mode, wherein the ON Mode enables dynamic thermal management, and (c) AUTO Mode, wherein the AUTO Mode enables and disables dynamic thermal management according to a prescribed computer operational characteristic.

The prescribed computer operational characteristic includes at least one of the following selected from the group consisting of AC power mode, AC power with battery present mode, AC power mode with battery present and charge mode, AC power with battery absent mode, DC power mode, and computer docked mode with AC power. In addition, the OFF Mode is characterized by a first thermal management algorithm. The ON Mode is characterized by a second thermal management algorithm. Lastly, the AUTO Mode is characterized by a third thermal management algorithm.

Although only a few exemplary embodiments have been described in detail above, those skilled in the art will readily appreciate that many modifications are possible in the exemplary embodiments without materially departing from the novel teachings and advantages described herein. Accordingly, all such modifications are intended to be included within the scope of this description as defined in the following claims. In the claims, means-plus-function clauses are intended to cover the structures described herein as performing the recited function and not only structural equivalents, but also equivalent structures.

What is claimed is:

1. A computer operable on at least one of AC and DC power comprising:
    at least one central processing unit;
    at least one fan disposed for providing cooling to said at least one central processing unit; and
    a thermal manager, said thermal manager for monitoring a temperature of said at least one central processing unit and dynamically controlling a throttling of said at least one central processing unit and said at least one fan according to a thermal management algorithm, whereby a determination to lower a temperature threshold is made based on the algorithm looking at an AC charge, a battery temperature and a battery charge status.

2. The computer of claim 1, wherein the thermal management algorithm enables stabilization of the temperature of said at least one central processing unit below a prescribed temperature threshold over a given duration of time.

3. The computer of claim 2, wherein the temperature threshold includes body temperature.

4. The computer of claim 1, wherein said thermal manager further includes at least one basic input output system (BIOS) table, the at least one BIOS table identifying specific cooling actions to be implemented as a function of the temperature of the at least one central processing unit.

5. The computer of claim 1, further comprising a user setup routine, wherein said user setup routine enables a user to select a desired thermal operation mode for said thermal manager, the thermal operation modes including at least one of the following selected from the group consisting of (a) OFF Mode, wherein the OFF Mode disables a dynamic thermal management by said thermal manager, (b) ON Mode, wherein the ON Mode enables dynamic thermal management by said thermal manager, and (c) AUTO Mode, wherein the AUTO Mode enables and disables dynamic thermal management by said thermal manager according to a prescribed computer operational characteristic.

6. The computer of claim 5, wherein the prescribed computer operational characteristic includes at least one of the following selected from the group consisting of AC power mode, AC power with battery present mode, AC power mode with battery present and charge mode, AC power with battery absent mode, DC power mode, and computer docked mode with AC power.

7. The computer of claim 5, wherein the user setup routine includes AUTO Mode for a default setting, requiring no user input.

8. The computer of claim 5, wherein the OFF Mode is characterized by a first thermal management algorithm, the ON Mode is characterized by a second thermal management algorithm, and the AUTO Mode is characterized by a third thermal management algorithm.

9. The computer of claim 8, wherein the first thermal management algorithm includes a thermal management algorithm of the computer absent any dynamic thermal management, wherein the second thermal management algorithm includes at least one of the following selected from the group consisting of (a) adjusting the thermal temperature threshold to be lower than body temperature, (b) enabling a CPU feature contained in a basic input output system (BIOS) of said computer, and (c) giving priority to said at least one fan if said computer is in an AC power mode, and wherein the third thermal management algorithm includes at least one of the following selected from the group consisting of (a) if said computer is docked in a docking station, then assume dynamic thermal management is in OFF Mode and do not adjust any temperature thresholds, (b) if said computer is not docked, then adjust the temperature thresholds to below body temperature, (c) if said computer is in AC power mode, then give thermal management priority to the at least one fan for holding the temperature of the at least one central processing unit down, and (d) if in DC power mode, utilize a new temperature threshold that is lower than body temperature for activation of thermal management by said thermal manager.

10. The computer of claim 9, wherein the CPU feature includes a function in BIOS for putting said at least one central processing unit into at least one low power state, wherein a cooling action may include said thermal manager causing the CPU feature to put said at least one central processing unit into the low power mode, even if said at least one central processing unit is not idle.

11. The computer of claim 10, wherein said thermal manager intermittently calls the CPU feature to effectively reduce a rate of rise in central processing unit temperature.

12. The computer of claim 1, wherein said computer further comprises a laptop computer and said thermal manager maintains a temperature of a case of said computer proximate a location of said at least one central processing unit to no more than body temperature.

13. The computer of claim 1, wherein said thermal manager is operable upon launching of an operating system of said computer.

14. The computer of claim 13, wherein said thermal manager is further operable according to an enable, disable, and automatically enable/disable option via a graphical user interface control application.

15. The computer of claim 13, wherein the operating system includes a CPU temperature reading function.

16. The computer of claim 13, wherein said thermal manager carries out thermal management via a system management basic input output system (SMBIOS), further wherein a system management interrupt (SMI) triggers each time the temperature of said at least one central processing unit falls outside of a given temperature range, and responsive thereto, said thermal manager invokes a corresponding cooling action according to the thermal management algorithm.

17. The computer of claim 16, wherein the thermal management algorithm is characterized by thermal tables representative of various conditions that include at least DC power mode and AC power mode, respectively, further wherein said thermal manager switches the thermal tables in and out dynamically in response to an SMI representative of a respective condition.

18. The computer of claim 17, further wherein said thermal manager utilizes advanced configuration and power interface (ACPI) functions for returning the central processing unit temperature reading, enabling thermal management, and disabling thermal management.

19. A thermal management method in a computer operating on at least one of AC and DC power including at least one central processing unit and at least one fan disposed for providing cooling to the at least one central processing unit, said method comprising:

monitoring a temperature of the at least one central processing unit; and responsive to the monitored temperature and in accordance with a thermal management algorithm, dynamically controlling (i) a throttling of the at least one central processing unit and (ii) operation of the at least one fan for enabling stabilization of the temperature of the at least one central processing unit below a prescribed temperature threshold over a given duration of time, whereby a determination to lower a temperature threshold is made based on the algorithm looking at an AC charge, a battery temperature and a battery charge status.

20. The method of claim 19, wherein the temperature threshold includes body temperature.

21. The method of claim 19, further comprising, utilizing at least one basic input output system (BIOS) table for the thermal management algorithm, the at least one BIOS table identifying specific cooling actions to be implemented as a function of the temperature of the at least one central processing unit.

22. The method of claim 19, further comprising, utilizing a user setup routine for enabling a user to select a desired thermal management operation mode for dynamically controlling thermal management, the thermal operation modes including at least one of the following selected from the group consisting of (a) OFF Mode, wherein the OFF Mode disables dynamic thermal management, (b) ON Mode, wherein the ON Mode enables dynamic thermal management, and (C) AUTO Mode, wherein the AUTO Mode enables and disables dynamic thermal management according to a prescribed computer operational characteristic.

23. The method of claim 22, wherein the prescribed computer operational characteristic includes at least one of the following selected from the group consisting of AC power mode, AC power with battery present mode, AC power mode with battery present and charge mode, AC power with battery absent mode, DC power mode, and computer docked mode with AC power.

24. The method of claim 22, wherein the OFF Mode is characterized by a first thermal management algorithm, the ON Mode is characterized by a second thermal management algorithm, and the AUTO Mode is characterized by a third thermal management algorithm.

25. The method of claim 24, wherein the first thermal management algorithm includes a thermal management algorithm of the computer absent any dynamic thermal management, wherein the second thermal management algorithm includes at least one of the following selected from the group consisting of (a) adjusting the thermal temperature threshold to be lower than body temperature, (b) enabling a CPU feature contained in a basic input output system (BIOS) of the computer, and (c) giving priority to the at least one fan if the computer is in an AC power mode, and wherein the third thermal management algorithm includes at least one of the following selected from the group consisting of (a) if the computer is docked in a docking station, then assume dynamic thermal management is in OFF Mode and do not adjust any temperature thresholds, (b) if the computer is not docked, then adjust the temperature thresholds to below body temperature, (c) if the computer is in AC power mode, then give thermal management priority to the at least one fan for holding the temperature of the at least one central processing unit down, and (d) if in DC power mode, utilize a new temperature threshold that is lower than body temperature for activation of thermal management.

26. The method of claim 25, wherein the CPU feature includes a function in BIOS for putting the at least one central processing unit into at least one low power state, wherein a cooling action may include said thermal manager causing the CPU feature to put said at least one central processing unit into the low power mode, even if the at least one central processing unit is not idle.

27. The method of claim 26, wherein dynamically controlling further includes intermittently calling the CPU feature to effectively reduce a rate of rise in central processing unit temperature.

28. The method of claim 19, wherein the computer is a laptop computer and said dynamically controlling step maintains a temperature of a case of the computer proximate a location of the at least one central processing unit to no more than body temperature.

29. A method of upgrading thermal management in a computer operating on at least one of AC and DC power having a central processing unit and a fan disposed for providing cooling to said central processing unit; said method comprising:

installing a thermal manager in a basic input output system (BIOS) of the computer; and storing a thermal management algorithm in the BIOS computer, wherein the thermal manager is operable for monitoring a temperature of the central processing unit and for dynamically controlling a throttling of the central processing unit and the fan according to the thermal management algorithm, wherein the thermal management algorithm enables stabilization of the temperature of the central processing unit below a prescribed temperature threshold over a given duration of time, whereby a determination to lower a temperature threshold is made based on the algorithm looking at an AC charge, a battery temperature and a battery charge status.

30. The method of claim 29, further comprising utilizing a basic input output system (BIOS) table for the thermal management algorithm, the BIOS table identifying specific cooling actions to be implemented as a function of the temperature of the central processing unit.

31. The method of claim 29, further comprising utilizing a user setup routine for enabling a user to select a desired thermal management operation mode for dynamically controlling thermal management, the thermal operation modes including one of the following selected from the group consisting of (a) OFF Mode, wherein the OFF Mode disables dynamic thermal management, (b) ON Mode, wherein the ON Mode enables dynamic thermal management, and (c) AUTO Mode, wherein the AUTO Mode enables and disables dynamic thermal management according to a prescribed computer operational characteristic.

32. The method of claim 31, wherein the prescribed computer operational characteristic includes one of the following selected from the group consisting of AC power mode, AC power with battery present mode, AC power mode with battery present and charge mode, AC power with battery absent mode, DC power mode, and computer docked mode with AC power.

33. The method of claim 31, wherein the OFF Mode is characterized by a first thermal management algorithm, the ON Mode is characterized by a second thermal management algorithm, and the AUTO Mode is characterized by a third thermal management algorithm.

* * * * *

UNITED STATES PATENT AND TRADEMARK OFFICE
CERTIFICATE OF CORRECTION

PATENT NO.       : 6,928,565 B2
APPLICATION NO.  : 09/834846
DATED            : August 9, 2005
INVENTOR(S)      : Watts, Jr. et al.

It is certified that error appears in the above-identified patent and that said Letters Patent is hereby corrected as shown below:

The title page showing the illustrative figure should be deleted to be replaced with the attached title page.

The drawing sheets, 1-5 consisting of Figs. 1-9, should be deleted to be replaced with drawing sheets, consisting of Figs. 1-9, as shown on the attached page.

Signed and Sealed this

Thirteenth Day of March, 2007

JON W. DUDAS
*Director of the United States Patent and Trademark Office*

(12) United States Patent
Watts, Jr. et al.

(10) Patent No.: US 6,928,565 B2
(45) Date of Patent: Aug. 9, 2005

(54) COMPUTER SYSTEM THERMAL LAP MANAGEMENT METHOD AND APPARATUS

(75) Inventors: La Vaughn F. Watts, Jr., Austin, TX (US); Kofi Nkisah Dadzie, Austin, TX (US); Yi Zhang, Austin, TX (US)

(73) Assignee: Dell Products L.P., Round Rock, TX (US)

(*) Notice: Subject to any disclaimer, the term of this patent is extended or adjusted under 35 U.S.C. 154(b) by 736 days.

(21) Appl. No.: 09/834,846

(22) Filed: Apr. 13, 2001

(65) Prior Publication Data
US 2002/0152408 A1 Oct. 17, 2002

(51) Int. Cl.$^7$ .................... G06F 1/20; G06F 1/28
(52) U.S. Cl. .................... 713/322; 713/300; 361/687; 361/695; 374/102
(58) Field of Search .................... 713/300, 322, 713/323, 324, 340; 361/93.8, 103, 124, 161, 676, 687, 695; 374/100, 101, 102, 178; 702/63, 99, 130, 132, 136

(56) References Cited

U.S. PATENT DOCUMENTS

| | | | |
|---|---|---|---|
| 5,652,893 A | * | 7/1997 | Ben-Meir et al. ......... 713/310 |
| 5,713,030 A | * | 1/1998 | Evoy ......................... 713/322 |
| 5,936,836 A | | 8/1999 | Scholder |
| 5,969,939 A | | 10/1999 | Moss et al. |
| 6,005,770 A | | 12/1999 | Schmitt |
| 6,058,009 A | | 5/2000 | Hood, III et al. |
| 6,311,287 B1 | * | 10/2001 | Dischler et al. ......... 713/601 |
| 6,397,343 B1 | * | 5/2002 | Williams et al. ......... 713/501 |
| 6,487,668 B2 | * | 11/2002 | Thomas et al. ......... 713/322 |
| 6,535,798 B1 | * | 3/2003 | Bhatia et al. ......... 700/293 |
| 6,574,740 B1 | * | 6/2003 | Odaohhara et al. ...... 713/323 |

OTHER PUBLICATIONS

Y. Tada, A. Takimoto, and Y. Hayashi, *Heat Transfer Enhancement In A Convective Field By Applying Ionic Wind*, The Gordon and Breach Publishing Group, Sep. 1996.
Brian S. Akre, *Ford To Test System that Eats Smog*, Global Platinum & Gold, Inc. Market Discussions, Nov. 1998.
Sam Atwood, *AQMD Investigates Ozone-Eating Catalyst*, AQMD Advisor newsletter, Jan. 1997.
Jeffrey B. Hoke, Ronald M. Heck and Terry C. Poles, *PremAir Catalyst System-A New Approach to Cleaning the Air*, SAE Technical Paper Series—Presented at International Fall Fuels & Lubricants Meeting Oct. 1999.

* cited by examiner

*Primary Examiner*—Thuan Du
(74) *Attorney, Agent, or Firm*—Haynes and Boone, LLP

(57) ABSTRACT

A computer comprises a central processing unit, at least one fan disposed for providing cooling to the at least one central processing unit, and a thermal manager. The thermal manager monitors a temperature of the central processing unit and dynamically controls a throttling of the central processing unit and the at least one fan according to a thermal management algorithm.

33 Claims, 9 Drawing Sheets

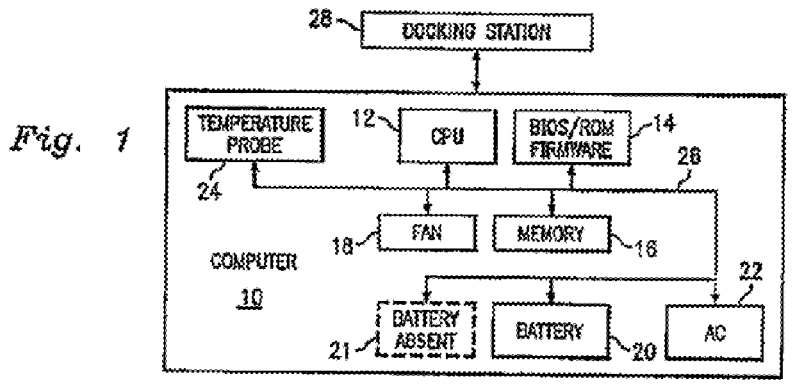

Fig. 1

| COOL LAP 7 | SMART CPU | HDD TIMER | MONITOR TIMER | SYSTEM TIMER | ACPI | AMBIENT | SURFACE TEMP |
|---|---|---|---|---|---|---|---|
| OFF | OFF | OFF | OFF | OFF | ON | 22.8 | 23 |

| TIME (MINUTES) | 0 | 5 | 10 | 15 | 20 | 25 | 30 |
|---|---|---|---|---|---|---|---|
| CPU TEMP | 37 | 56 | 60 | 57 | 59 | 60 | 59 |
| CPU TEMP IN F | 98.6 | 132.8 | 140 | 134.6 | 138.2 | 140 | 138.2 |
| CASE TEMP | 24.8 | 28.2 | 31.8 | 34.6 | 36.3 | 38.1 | 38.9 |
| CASE TEMP IN F | 76.64 | 82.76 | 89.24 | 94.28 | 97.34 | 100.58 | 102.02 |
| CPU SPEED | 752 | 752 | 752 | 752 | 752 | 752 | 752 |
| APPLICATION | EXCITE EXTREME 3D FASHION SHOW | | | | | | |

| TIME (MINUTES) | 35 | 40 | 45 | 50 | 55 | 60 |
|---|---|---|---|---|---|---|
| CPU TEMP | 53 | 59 | 51 | 60 | 59 | 58 |
| CPU TEMP IN F | 127.4 | 138.2 | 123.8 | 140 | 138.2 | 136.4 |
| CASE TEMP | 40.2 | 41.2 | 41.6 | 42.1 | 42.6 | 42.8 |
| CASE TEMP IN F | 104.36 | 106.16 | 106.88 | 107.78 | 108.68 | 109.04 |
| CPU SPEED | 752 | 752 | 752 | 752 | 752 | 752 |
| APPLICATION | EXCITE EXTREME 3D FASHION SHOW | | | | | |

| COOL LAP 7b | SMART CPU | HDD TIMER | MONITOR TIMER | SYSTEM TIMER | ACPI | AMBIENT | SURFACE TEMP |
|---|---|---|---|---|---|---|---|
| ON | ON | OFF | OFF | OFF | ON | 23.1 | 24.4 |
| TIME (MINUTES) | 0 | 5 | 10 | 15 | 20 | 25 | 30 |
| CPU TEMP | 32 | 48 | 47 | 48 | 49 | 49 | 50 |
| CPU TEMP IN F | 89.6 | 118.4 | 116.6 | 118.4 | 120.2 | 120.2 | 122 |
| CASE TEMP | 26.5 | 30 | 32.2 | 33.7 | 34.5 | 35.2 | 35.8 |
| CASE TEMP IN F | 79.7 | 86 | 89.96 | 92.66 | 94.1 | 95.36 | 96.44 |
| CPU SPEED | 693 | 694 | 604 | 604 | 605 | 802 | 604 |
| APPLICATION | EXCITE EXTREME 3D FASHION SHOW |||||||

| TIME (MINUTES) | 35 | 40 | 45 | 50 | 55 | 60 |
|---|---|---|---|---|---|---|
| CPU TEMP | 49 | 49 | 50 | 50 | 50 | 50 |
| CPU TEMP IN F | 120.2 | 120.2 | 122 | 122 | 122 | 122 |
| CASE TEMP | 36.2 | 36.5 | 36.8 | 37 | 37.3 | 37.5 |
| CASE TEMP IN F | 97.16 | 97.7 | 98.24 | 98.6 | 99.14 | 99.5 |
| CPU SPEED | 604 | 603 | 608 | 604 | 604 | 604 |
| APPLICATION | EXCITE EXTREME 3D FASHION SHOW ||||||

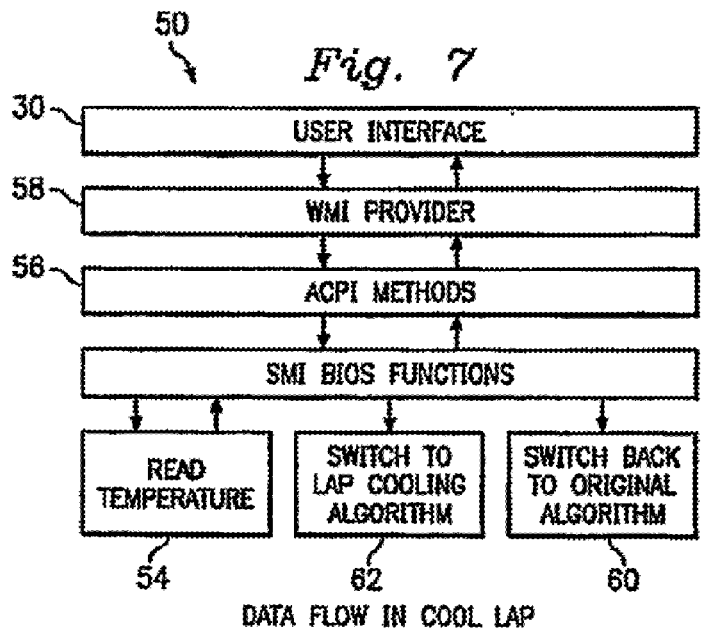

Fig. 7

DATA FLOW IN COOL LAP

Fig. 8

| LOWER RANGE | VALUE | HIGHER RANGE | VALUE | ACTION |
|---|---|---|---|---|
| TEMP_ABS_LOW: | −128 | RANGE_1_HI: | 23 | No Action |
| RANGE_1_LO: | 20 | RANGE_2_HI: | 25 | No Action |
| RANGE_2_LO: | 22 | RANGE_3_HI: | 26 | TH1, Fan1 Low |
| RANGE_3_LO: | 23 | RANGE_4_HI: | 27 | TH1, Fan1 Hi |
| RANGE_4_LO: | 24 | RANGE_5_HI: | 55 | TH1, Fan1 Hi, Fan2 Low |
| RANGE_5_LO: | 47 | RANGE_6_HI: | 65 | TH2, Fan1 Hi, Fan2 Hi |
| RANGE_6_LO: | 58 | RANGE_7_HI: | 90 | TH3, Fan1 Hi, Fan2 Hi |
| RANGE_7_LO: | 55 | TEMP_CRITICAL−1: | 101 | TH4, Fan1 Hi, Fan2 Hi |
| RANGE_8_LO: | 90 | TEMP_CRITICAL: | 102 | TH4, Fan1 Hi, Fan2 Hi, ACPINOTIFY |
| | | | | SwOff (Power off the unit) |

Fig. 9

| LOWER RANGE | VALUE | HIGHER RANGE | VALUE | ACTION |
|---|---|---|---|---|
| TEMP_ABS_LOW: | −128 | RANGE_1_HI: | 23 | No Action |
| RANGE_1_LO: | 20 | RANGE_2_HI: | 25 | No Action |
| RANGE_2_LO: | 22 | RANGE_3_HI: | 26 | TH1, Fan1 Low |
| RANGE_3_LO: | 23 | RANGE_4_HI: | 27 | TH1, Fan1 Hi |
| RANGE_4_LO: | 24 | RANGE_5_HI: | 50 | TH1, Fan1 Hi, Fan2 Low |
| RANGE_5_LO: | 42 | RANGE_6_HI: | 60 | TH2, Fan1 Hi, Fan2 Hi |
| RANGE_6_LO: | 53 | RANGE_7_HI: | 75 | TH3, Fan1 Hi, Fan2 Hi |
| RANGE_7_LO: | 60 | TEMP_CRITICAL−1: | 101 | TH4, Fan1 Hi, Fan2 Hi |
| RANGE_8_LO: | 90 | TEMP_CRITICAL: | 102 | TH4, Fan1 Hi, Fan2 Hi, ACPINOTIFY |
| | | | | SwOff (Power off the unit) |